US012605729B2

(12) United States Patent
Lee

(10) Patent No.: US 12,605,729 B2
(45) Date of Patent: Apr. 21, 2026

(54) CONTAINER FOR DISCHARGING LIQUID CONTENTS

(71) Applicant: PUM-TECH KOREA CO., LTD, Incheon (KR)

(72) Inventor: Do Hoon Lee, Incheon (KR)

(73) Assignee: PUM-TECH KOREA CO., LTD, Incheon (KR)

( * ) Notice: Subject to any disclaimer, the term of this patent is extended or adjusted under 35 U.S.C. 154(b) by 144 days.

(21) Appl. No.: 18/579,028

(22) PCT Filed: Jul. 15, 2022

(86) PCT No.: PCT/KR2022/010340
§ 371 (c)(1),
(2) Date: Jan. 12, 2024

(87) PCT Pub. No.: WO2023/013918
PCT Pub. Date: Feb. 9, 2023

(65) Prior Publication Data

US 2024/0307904 A1 Sep. 19, 2024

(30) Foreign Application Priority Data

Aug. 6, 2021 (KR) ........................ 10-2021-0103906

(51) Int. Cl.
*B05B 11/04* (2006.01)
*B05B 11/00* (2023.01)

(52) U.S. Cl.
CPC .......... *B05B 11/04* (2013.01); *B05B 11/0072* (2013.01); *B05B 11/047* (2013.01)

(58) Field of Classification Search
CPC ... B05B 11/04; B05B 11/0072; B05B 11/047; B65D 83/771; B65D 47/0838;
(Continued)

(56) References Cited

U.S. PATENT DOCUMENTS 5,630,531 A * 5/1997 Gaucher ............. B05B 11/0044 222/105
6,997,353 B2 * 2/2006 Decottignies ......... B05B 11/046 222/105
(Continued)

FOREIGN PATENT DOCUMENTS

JP 1029647 * 7/1996
JP 10-029647 A 2/1998
(Continued)

*Primary Examiner* — Vishal Pancholi
(74) *Attorney, Agent, or Firm* — Heedong Chae; Lucem, PC

(57) ABSTRACT

A container for discharging liquid contents according to an embodiment of the present invention comprises: an inner container in which liquid contents are accommodated; an outer container surrounding the outside of the inner container; a sealing frame which blocks an open side of the outer container, is coupled with the inner container, and has an air inlet hole; an air inlet valve which is installed in the sealing frame and opens and closes the air inlet hole in response to changes in the pressure inside the outer container; a shoulder which is coupled to one side of the outer container and surrounds the sealing frame, and has a discharge passage formed therein; a nozzle which is coupled to the shoulder and has a discharge port formed therein; and a discharge valve which is installed on the shoulder and opens and closes the discharge passage by means of the discharge pressure of the liquid contents.

11 Claims, 7 Drawing Sheets

(58) Field of Classification Search
CPC .... B65D 47/2075; B65D 77/06; B65D 47/06; B65D 47/32; A47K 5/1201; A47K 5/1205
See application file for complete search history.

(56) References Cited

U.S. PATENT DOCUMENTS

| | | | |
|---|---|---|---|
| 2017/0056904 | A1 | 3/2017 | Brugger |
| 2019/0022680 | A1 | 1/2019 | Adam |

FOREIGN PATENT DOCUMENTS

| | | | |
|---|---|---|---|
| JP | 2002-104547 | A | 4/2002 |
| JP | 2006-111335 | A | 4/2006 |
| KR | 20-0464780 | B1 | 1/2013 |
| KR | 10-1403741 | B1 | 6/2014 |

* cited by examiner

CONTAINER FOR DISCHARGING LIQUID CONTENTS

TECHNICAL FIELD

The present invention relates to a container for discharging liquid contents, and more specifically, to a container for discharging liquid contents having a discharge valve for opening and closing a discharge passage by means of the discharge pressure of the liquid contents and an air inlet valve for opening and closing an air inlet hole in response to changes in the pressure inside the container so as to stably maintain the sealing and pressure inside the container.

Nowadays, according to the trend of the modern society that has diversified rapidly, persons use cosmetics as needed regardless of sex and age. In particular, women are using a variety of cosmetics, makeup products having various colors and makeup tools, and by the cosmetic-related companies' research and development, a variety of high-quality makeup products and tools are being released on the market every day.

According to the purpose of use, the above-mentioned cosmetic products may be classified into: face cleansing cosmetics used to remove sebum, waste, and pollutants from the skin surface; base cosmetics used to properly supply moisture and oil to the skin; color cosmetics used to express the impression of beautiful colors; hair cosmetics used not only to remove foreign substances from the hair or scalp but also to protect hair and supply nutrition to it; and perfume used to exude a scent to others by dissolving fragrances in alcohol, etc.

Meanwhile, the above-mentioned cosmetic products are mostly manufactured from natural raw materials as interests in the safety of cosmetic compositions and in skin care have increased due to the improvement of living standards; however, these cosmetic products do not have additives such as preservatives, etc. to minimize the irritation to the skin, thereby having a disadvantage of having a relatively high risk of deterioration, compared to those manufactured from chemical raw materials. For example, when using the above-mentioned cosmetic products, the cosmetics may be contaminated or deteriorated due to the invasion of germs by contact with outside air or the oxidization of the composition by contact with air.

In addition, for those cosmetic products, containers having a simple opening and closing function have been used to store and use cosmetics in liquid or gel form, such as lotion, cream, gel, shampoo, rinse, etc., but these containers are inconvenient in that the user is required to take out the cosmetic materials from the container with a spatula or a finger to apply them to the skin or hair.

Accordingly, tube-type cosmetic containers which discharge cosmetic materials to the outside through changes in internal pressure caused by pressing the container, or pump-type cosmetic containers that suction and discharge cosmetic materials through the pumping operation of a pump, etc. are being used.

The tube-type cosmetic containers have a structure, in which when the user presses a soft container inwards to change the internal pressure of the container, the cosmetic material contained inside the container are discharged to the outside through a discharge port of a nozzle.

However, in the case of the tube-type cosmetic container, there is a risk that the cosmetic contained inside the container is still exposed to the outside through the discharge port of the nozzle and thus may be contaminated, and as the cosmetic materials are discharged for use, the outer shape of the container is shrunken and deformed, resulting in a poor appearance. And it is difficult to store or use the container upright, and since it is mainly made of a single container, there is a problem that cosmetics can easily deteriorate due to external factors such as ultraviolet rays, etc. or become vulnerable to external shocks.

In the case of the pump-type cosmetic container, it comprises a container body in which the contents are accommodated, a press-type pump which are provided in an opening of the container body and is operated by pressing, and a nozzle head connected to the upper part of the container body in a state where it is connected to the press-type pump. When the nozzle head that is exposed to the outside is pressed downward, the contents accommodated in the container body are discharged to the outside in a certain amount by the pumping operation of the press-type pump. Such pump-type cosmetic containers have the advantages in that the contents contained in the container body do not come into contact with the outside air, that they are economical because the contents are not discharged excessively through the discharge port of the nozzle, and that they are convenient to use as they can be operated even when the container body is placed on the floor.

However, in the pump-type cosmetic container, the pump consists of several parts, where the parts are systematically operated with each other, so the structure is complicated and the number of parts is increased. This leads to the increases in the assembly process, time, and manufacturing cost, and there is a problem with smooth discharging operation due to manufacturing tolerances or malfunctions during use.

In order to solve the problems above, a dual structure storing vessel having a pumping function by means of a check valve is disclosed in Korean Utility Model Registration No. 20-0464780. The conventional technology relates to a dual structure storing vessel for storing the contents inside and discharging them for use, and has the dual structure of a tube having elasticity and a bag containing the contents inside the tube, wherein a nozzle cap having a discharge hole is coupled to the upper coupling portion, while the tube is provided with a suction check valve for sucking in outside air when the tube is pressed, and a discharge valve for discharging the contents to the outside by pressing the bag into the discharge hole of the nozzle cap, which allows the bag to be gradually compressed by means of the pumping operation by the compression of the tube so as to discharge the contents. Therefore, it is easy to discharge the contents for use and may prevent the risk of deterioration of the contents due to contact with air.

However, in the conventional technology above, the suction check valve is exposed to the outside, so when outside air was sucked into the container through the suction check valve, external foreign substances may be introduced together, causing an unhygienic problem.

In addition, the conventional technology has a structure where the tube and the bag are integrally sealed and bonded, and where the nozzle cap having a discharge hole is fitted and coupled to the inside of the opening of the tube and the bag, which has a problem that the space between the tube and bag and the nozzle cap is widened by continuous pressure of the tube, resulting in a decrease in the cohesion and sealing force among the components.

PRIOR ART DOCUMENTS

Patent Documents (Patent document 0001) Korean Utility Model Registration No. 20-0464780 (published on Jan. 21, 2013)
(Patent document 0002) Korean Patent Registration No. 10-1403741 (published on Jun. 3, 2014)

DISCLOSURE

Technical Problem

In order to resolve the problems above, the present invention has an object to provide a container for discharging liquid contents which is provided with a discharge valve for opening and closing the discharge passage by means of the discharge pressure of the liquid contents and an air inlet valve for opening and closing the air inlet hole in response to changes in the pressure inside the container, which allows each valve, in the case of pressing or depressurize the container, to be selectively operated, thereby helping the liquid contents to be easily discharged and also the sealing and pressure inside the container to be stably maintained.

Technical Solution

In order to achieve the object as stated above, the present invention provides a container for discharging liquid contents comprising: an inner container in which liquid contents are accommodated; an outer container surrounding the outside of the inner container; a sealing frame which blocks an open side of the outer container, is coupled with the inner container, and is provided with an air inlet hole; an air inlet valve which is installed in the sealing frame and opens and closes the air inlet hole in response to changes in the pressure inside the outer container; a shoulder which is coupled to one side of the outer container and surrounds the sealing frame, and is provided with a discharge passage; a nozzle which is coupled to the shoulder and is provided with a discharge port; and a discharge valve which is installed in the shoulder and opens and closes the discharge passage by means of the discharge pressure of the liquid contents.

In addition, the inner container is characterized by being a pouch container of which the shape varies as the liquid contents accommodated therein are exhausted.

Also, the container is characterized by consisting of: a soft receiving portion for accommodating the liquid contents therein; and a hard coupling portion which is coupled to one side of the receiving portion and is provided with an inlet portion.

Further, the sealing frame is characterized by consisting of a bottom surface, an inner wall extending upward from the bottom surface, and an outer wall spaced apart at a predetermined interval from the outside of the inner wall, while at least a part thereof is inserted into the open portion of the outer container.

And the container is characterized in that a through hole, through which the inlet portion of the inner container passes, is formed inside the inner wall, and wherein a fitting bending is extendedly formed outside the outer wall so as to be fitted into a top of the outer container.

And the container is characterized in that an air inlet guide pipe is extendedly formed in one side, and a valve insertion groove into which the air inlet valve is inserted is formed on the other side, with respect to the air inlet hole of the sealing frame.

And the container is characterized in that at least one air through hole is formed on an upper end of a rim of the sealing frame.

And the container is characterized in that the shoulder is provided with a first tightly-contacting protrusion on the lower side, and a second tightly-contacting protrusion that is spaced apart from the outside of the first tightly-contacting protrusion at a predetermined interval, said first and second tightly-contacting protrusions being tightly contacted with the both sides of the coupling part of the inner container and the sealing frame.

And the container is characterized in that a soft sealing ring is provided between the first and second tightly-contacting protrusions and comes into close contact with the top of the inner container and the sealing frame.

And the container is characterized in that at least one valve seating portion on which the discharge valve is seated, is formed inside the shoulder to be spaced at a predetermined interval so that it can be vertically extended.

And the container is characterized in that a shoulder lid is provided in one side of the shoulder so as to open and close the discharge port of the nozzle.

And the container is characterized in that the air inlet valve and the discharge valve are disk-shaped valves.

Advantageous Effects

According to one aspect of the present invention, the present invention is provided with a discharge valve for opening and closing the discharge passage by means of the discharge pressure of the liquid contents and an air inlet valve for opening and closing the air inlet hole in response to changes in the pressure inside the container, which allows each valve, in the case of pressing or depressing the container, to be selectively operated, thereby having the effects that the liquid contents can be easily discharged and that the sealing and pressure inside the container can stably be maintained.

According to one aspect of the present invention, the sealing frame is inserted into the one open side of the outer container, and the sealing frame is surrounded by the shoulder so that the air inlet hole and the air inlet valve of the sealing frame can be placed inside the shoulder, which prevents the inflow of foreign substances due to external exposure, resulting in more hygienic use.

According to one aspect of the present invention, the opening and closing of the discharge passage and the air inlet hole by pressing or depressing of the container and the simplification of the sealing structure inside the discharge container result in the effects of simplifying the manufacturing process, improving the productivity through the reduction of manufacturing cost, and reducing the waste of resources through such minimization of the constitution.

According to one aspect of the present invention, the sealing frame which blocks one side of the outer container is coupled with the inner container for accommodating the liquid contents therein, and the part where the inner container and the sealing frame are coupled is surrounded by the shoulder so that the shoulder can be coupled with the outer container, which results in an effect of increasing the coupling force between the inner container and the sealing frame and the sealing force within the outer container.

BEST MODE

Mode for Invention

Figure 1:
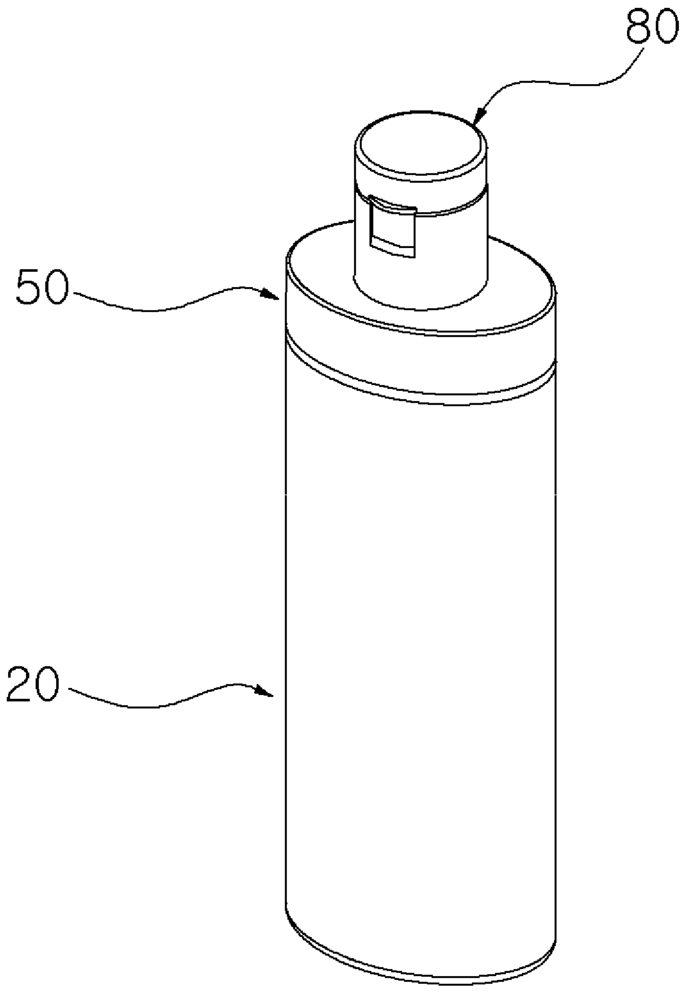
FIG. 1 is a perspective view of the container for discharging liquid contents according to one aspect of the present invention.

The detailed description of the present invention will be described below with reference to the accompanying drawings showing specific aspects in which the present invention can be carried out. These aspects will be described in detail as sufficient as to enable those skilled in the art to practice the present invention. It may be understood that various aspects of the present invention do not need to be mutually exclusive although they are different from each other. For example, the specific shapes, structures and characteristics disclosed herein may be implemented in other aspects in relation to one aspect without departing from the spirit and scope of the present invention. In addition, it may be understood that the positions or arrangements of individual constituent elements in each disclosed aspect can be changed without departing from the spirit and scope of the present invention.

Accordingly, the detailed description described below is not intended to be taken as a restrictive meaning, but if it is properly described, the scope of the present invention is restricted only by the appended claims, together with all scopes equivalent to the claims. In the drawings, the similar reference numerals refer to the same or similar functions throughout several aspects The terms used in the present invention have been selected from currently widely used general terms in consideration of the functions in the present invention. However, the terms may vary according to the intention of a person having ordinary skill in the art, case precedents, and the advent of new technologies. Also, for special cases, meanings of the terms selected by the applicant are described in detail in the description section. Accordingly, the terms used in the present invention are defined based on their meanings in relation to the contents discussed throughout the specification, not by their simple meanings When a part may "include" a certain constituent element, unless specified otherwise, it may not be construed to exclude another constituent element but may be construed to further include other constituent elements.

Hereinafter, a container for discharging liquid contents according to one aspect of the present invention will be explained in detail with reference to the attached drawings.

Figure 2:
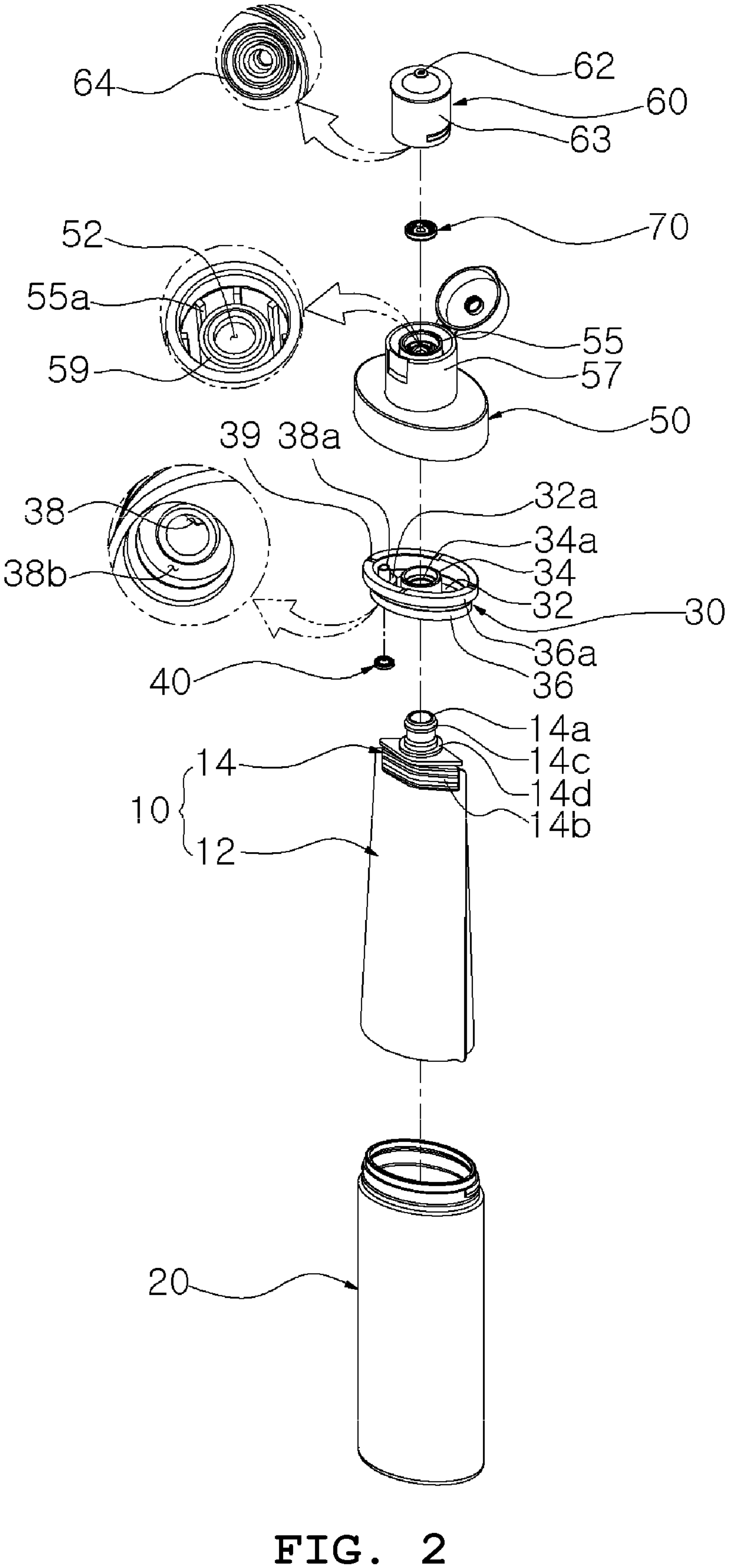
FIG. 2 is an exploded perspective view of the container for discharging liquid contents according to one aspect of the present invention.
Figure 3:
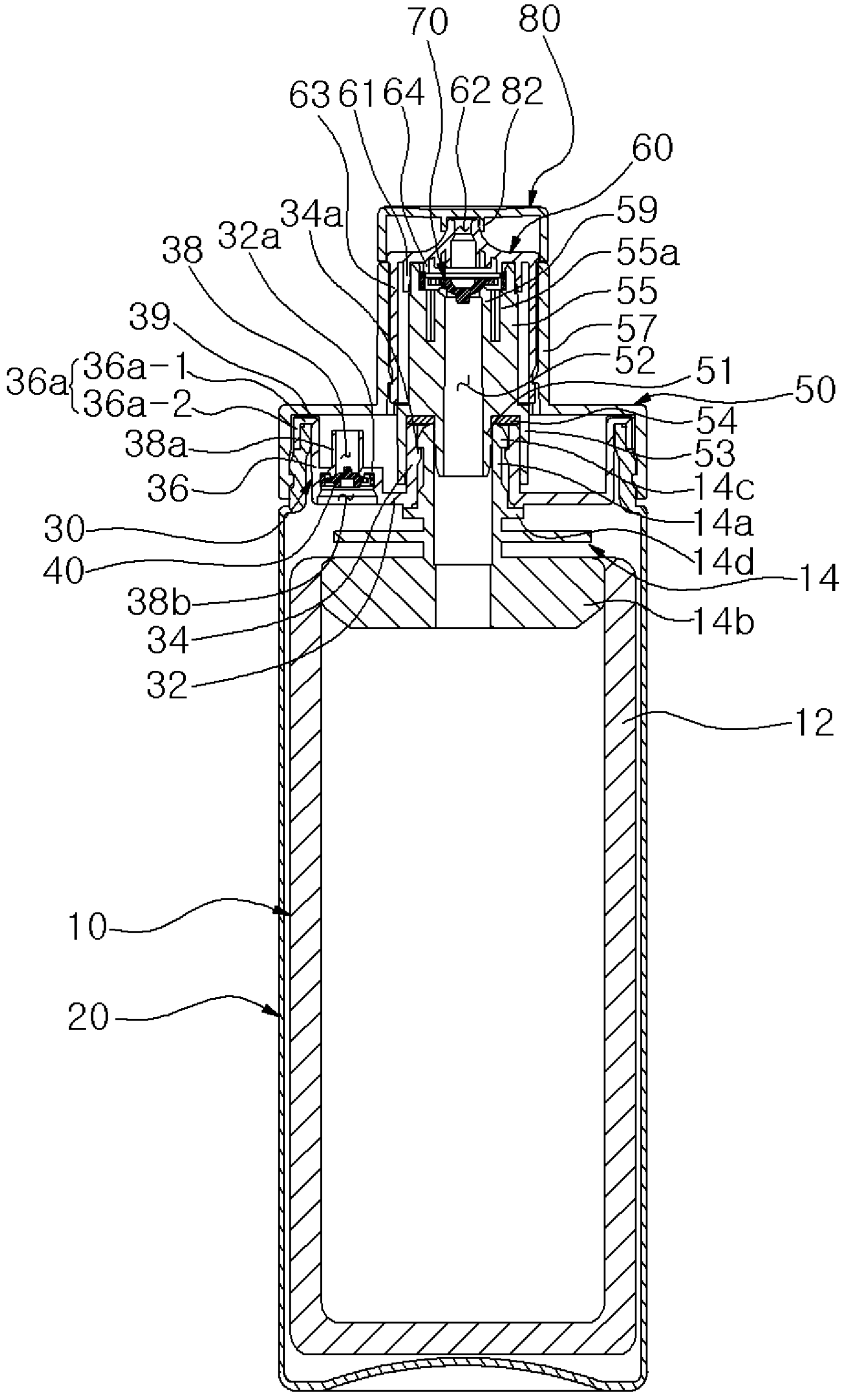
FIG. 3 is a sectional view of the container for discharging liquid contents according to one aspect of the present invention.

FIG. 1 is a perspective view of the container for discharging liquid contents according to one aspect of the present invention, FIG. 2 is an exploded perspective view of the container for discharging liquid contents according to one aspect of the present invention, and FIG. 3 is a sectional view of the container discharging liquid contents according to one aspect of the present invention.

As shown in the drawings, the container for discharging liquid contents according to one aspect of the present invention may include an inner container (10), an outer container (20), a sealing frame (30), an air inlet valve (40), a shoulder (50), a nozzle (60), and a discharge valve (70).

The container for discharging liquid contents according to one aspect of the present invention will be described separately for each component as follows.

The inner container (10) is a storage container in which liquid contents are accommodated, and the interior thereof is kept in a vacuum so that liquid contents can be stored safely. The liquid contents may include all contents in a liquid or gel form, such as cosmetics, shampoo, or soap. At this time, the inner container (10) is preferably a pouch container whose shape varies as the liquid contents contained therein are exhausted.

The inner container (10) may consist of a soft receiving portion (12) in which the liquid contents are accommodated, and a hard coupling portion (14) that is bonded to the receiving portion (12) so as to be coupled to the sealing frame (30).

As shown in FIG. 2, an inlet (**14*a*) is provided in one side of the coupling portion (14), the inlet (14*a*) penetrating the center of the sealing frame (30). Through the inlet (14*a*), the liquid contents are injected. On the opposite side of the inlet (14*a*), a bonding portion (14*b*) is provided, and the receiving portion (12) is bonded while surrounding the bonding portion (14*b*). And on the outer periphery of the inlet (14*a*), a first fastening protrusion (14*c*) is protruded and can detachably be coupled to the sealing frame (30). Meanwhile, a locking protrusion (14*d*) is protruded outward between the inlet (14*a*) and the bonding portion (14*b*) of the coupling portion (14) so that it can be locked on the lower surface of the sealing frame (30). Accordingly, the inner container (10) will not flow to the upper side of the sealing frame (30), and the upper surface of the locking protrusion (14*d*) comes into contact with the lower surface of the sealing frame (30), thereby increasing the sealing force inside the outer container (20**).

The outer container (20) protects the inner container (10) by surrounding the outside of it. The outer container (20) is in the form of a hard oval cylinder with one side open, and forms the appearance of the container for discharging liquid contents. Of course, the outer container (20) is not limited to the oval cylinder shape, and may be formed in various shapes or with materials in consideration of the type of contents stored inside, usability, design elements, etc. Meanwhile, the outer container (20) is preferably narrow, relatively long, and has a gentle bottom so that the user can easily hold it by hand and easily place it on the floor.

As shown in FIG. 3, a protrusion is formed at an upper outer periphery of the outer container (20) and can be fixedly coupled to a protrusion formed at an inner periphery of the shoulder (50). At this time, the protrusion formed at the outer container (20) may be formed partially at the outer periphery of the outer container (20), in consideration of the cohesion among the components and ease of assembly, etc., or may be formed entirely along the circumference of the outer container (20). The drawings of the container for discharging liquid contents according to one aspect of the present invention show that the outer container (20) and the shoulder (50) are undercut-coupled, but the present invention is not limited thereto, and it may have various coupling manners such as the coupling of the protrusion and groove, or by-force fitting coupling or adhesion, etc.

The sealing frame (30) blocks one open side of the outer container (20) to seal the interior of the outer container (20).

As shown in FIG. 2, the sealing frame (30) is formed in the shape of a stereoscopic ring having a certain space inside the upper part, and at least one part thereof may be inserted into the open part of the outer container (20).

The sealing frame (30) may consist of a bottom surface (32), an inner wall (34) that is extended upward from the bottom surface (32) and an outer wall (36) that is spaced apart at a predetermined interval from the outside of the inner wall (34).

In the inner wall (34) of the sealing frame (30), a second fastening protrusion (34*a*) is protruded toward the central part, the second fastening protrusion (34*a*) being detachably coupled with the first fastening protrusion (14*c*), wherein a through hole is formed inside the inner wall (34) through which the inlet (14*a*) of the inner container (10) can pass.

The outer wall (36) of the sealing frame (30) is tightly-contact with the upper inner periphery of the outer container (20), and a fitting bending portion (36*a*) is extendedly formed on the outside of the outer wall (36), and thus may be fitted and coupled with the top of the outer container (20). The fitting bending portion (36*a*) may consist of a first fitting-bending portion (36*a*-1) that is extendedly formed toward the outside from the outer wall (36) and is seated on the top of the outer container (20), and a second fitting-bending portion (36*a*-2) that is extendedly formed toward the lower side of the first fitting bending portion (36*a*-1) and is tightly contacted with the upper outer periphery of the outer container (20). At this time, the first fitting bending portion (36*a*-1) of the fitting bending portion (36*a*) may stably be fixed as the top thereof is pressed by the shoulder (50). That is, the fitting-bending portion (36*a*) is preferably in the shape of a ring integrally connected to the outside of the sealing frame (30) so that it can be hung and fixed on the upper part of the outer container (20).

Meanwhile, the sealing frame (30) may be provided with an air inlet hole (38) which introduces external air according to changes in the internal pressure of the outer container (20). As shown in FIG. 3, the sealing frame (30) is provided with a protrusion (32*a*) that is extended upward from the bottom surface (32), wherein the protrusion (32*a*) has a certain height, the lower part thereof is open, and its upper surface may be provided with an air inlet hole (38). Through the open lower part of the protrusion (32*a*), an air inlet valve (40) is inserted into the inner space thereof, which may improve the coupling stability, ease of assembly, and space utilization of the air inlet valve (40).

With respect to the air inlet hole (38), an air inlet guide pipe (38*a*) may be formed to extend upward on one side, and a valve insertion groove (38*b*) into which the air inlet valve (40) is inserted may be formed on the other side. The air inlet guide pipe (38*a*) extends vertically from the upper surface of the protrusion (32*a*) of the sealing frame (30) to become the side wall of the air inlet hole (38), and is placed in the space surrounded by the inner wall (34) and the outer wall (36) of the sealing frame (30) and the shoulder (50). That is, in the conventional containers, an air intake hole is exposed to the outside, and thus when external air was sucked into the container through the air intake hole, external foreign substances are introduced together, causing an unsanitary problem. Accordingly, in the container for discharging liquid contents according to one aspect of the present invention, the air inlet hole (38) and the air inlet valve (40) are placed in the space inside the container between the sealing frame (30) and the shoulder (50) so that they are not exposed to the outside, and the air inlet guide pipe (38*a*) is provided outside the air inlet hole (38) in order to prevent the external foreign substances from entering into the air inlet hole (38), allowing for more hygienic use.

Meanwhile, at least one air through hole (39) may be formed at an upper end of a rim of the sealing frame (30). As shown in FIGS. 2 and 3, the air through hole (39), which is a groove that penetrates the outer upper surface of the sealing frame (30) and connects the outer and inner spaces of the sealing frame (30), becomes a passage for introducing the outside air passing through the gap between the upper outer periphery of the outer container (20) and the lower inner periphery of the shoulder (50) into the air inlet hole (38).

The air inlet valve (40) is installed in the sealing frame (30) and selectively opens and closes the air inlet hole (38) in response to changes in the pressure inside the outer container (20). In other words, in the case of pressing the outer container (20), the air inlet valve (40) blocks the air inlet hole (38) of the sealing frame (30); and in the case of depressing the outer container (20), the air inlet valve opens the air inlet hole (38) as it is pulled by vacuum pressure generated inside the outer container (20), and at the same time, as external air flows into the air inlet hole (38), the outer container (20) is restored to its original shape. Here, the air inlet valve (40) is installed so that the central part thereof can move elastically along the inflow direction of external air.

As described above, the air inlet valve (40), through the open lower part of the protrusion (32*a*) formed in the sealing frame (30), is inserted and fixedly coupled into the inner space of it, that is, the valve insertion groove (38*b*), and thus exposure of the air inlet valve (40) can be minimized. Here, the air inlet valve (40) is preferably a disk-shaped valve.

The shoulder (50) is coupled with one side of the outer container (20) while surrounding the sealing frame (30). Preferably, the lower part of the shoulder (50) is in the form of an oval cylinder having the same width as that of the outer container (20) for the continuity of the design, and the upper part is in the form of a relatively narrow cylinder or oval cylinder, compared to that of the lower part.

A discharge passage (52) through which the liquid contents accommodated in the inner container (10) passes may be formed in the center inside the shoulder (50). At this time, the discharge passage (52) is connected to the inlet (14*a*) of the inner container (10), and can appropriately be extended in the same direction as the inlet (14*a*) for smooth discharge of the liquid contents.

As shown in FIG. 3, the shoulder (50) is provided with a first tightly-contacting protrusion (51) at the lower part, and a second tightly-contacting protrusion (53) spaced part at a predetermined interval at the outside of the first tightly-contacting protrusion (51), wherein the first tightly-contacting protrusion (51) and the second tightly-contacting protrusion (53) may be tightly-contacted with both sides of the coupling portion of the inner container (10) and the sealing frame (30). More specifically, the first tightly-contacting protrusion (51) is tightly-contacted with the inner periphery of the inlet (14*a*) as it is inserted inside the inlet (14*a*) of the inner container (10), and the second tightly-contacting protrusion (53) is tightly-contacted with the outer periphery of the inner wall (32) of the sealing frame (30). Accordingly, the inlet (14*a*) and the inner wall (32) are inserted together between the first tightly-contacting protrusion (51) and the second tightly-contacting protrusion (53) and thus are not spaced from each other, which makes it possible to stably maintain the coupling portion between the inner container (10) and the sealing frame (30), that is, the coupling portion between the first fastening protrusion (14*c*) and the second fastening protrusion (34*a*).

Meanwhile, a soft sealing ring (54) is formed between the first tightly-contacting protrusion (51) and the second tightly-contacting protrusion (53) and is tightly-contacted with the upper end of the inlet (14*a*) of the inner container (10) and the upper end of the inner wall (32) of the sealing frame (30), which makes it possible to maintain the sealing force inside the outer container (20). Here, the sealing ring (54), in order to improve the sealing force, is made from elastic materials, preferably, one of the materials among urethane rubber, natural rubber, elastomer, NBR (nitrile-butadiene rubber) and silicone, or polypropylene, polyethylene, ABS (Acrylonitrile Butadiene Styrene) materials having elasticity. Particularly, it is most desirable to be made from TPE (Thermo Plastic Elastomer), a material between soft rubber with excellent durability and plastic.

A first upper extension protrusion (55) is extended upward in the inner upper part of the shoulder (50), and a second upper extension protrusion (57) that is spaced at a predetermined interval from the outside of the first upper extension protrusion (55) may be extended upward. Wherein, a nozzle (60) is fixedly coupled to the inner periphery of the second upper extension protrusion (57).

The first upper extension protrusion (55) is a part where a discharge valve (70) to be described below is inserted and seated, wherein the outer periphery of the discharge valve (70) is tightly-contacted with the inner periphery of the first upper extension protrusion (55), which prevents the discharge valve (70) from flowing horizontally, and at least one valve seat (55*a*) is formed inside the first upper extension protrusion (55) so that the rim of the discharge valve (70) may be seated on the top of it. At this time, it is desirable that the valve seat (55*a*) is spaced at a predetermined interval and is vertically extended along the circumference of the inner periphery of the first upper extension protrusion (55). And a third upper extension protrusion (59) that is spaced at a predetermined interval and can be extended upward from the inside of the upper extension protrusion (55), wherein the third first upper extension protrusion (59) forms the outer wall of the discharge passage (52), and simultaneously, part of the center of the discharge valve (70) is seated on the top of it.

Meanwhile, a shoulder lid (80) is formed at one side of the shoulder (50) to open and close the discharge port (62) of the nozzle (60). The shoulder lid (80) is integrally hinge-coupled to the shoulder (50) and rotates at a certain angle to open or close the discharge port (62) of the nozzle (60). Of course, the shoulder lid (80) may be formed separately from the shoulder (50) and can be hinge-coupled to one side of the shoulder (50). And a sealing protrusion (82) may be formed to protrude in a ring shape on the inner upper surface of the shoulder lid (80), wherein said sealing protrusion (82) is inserted while surrounding the end of the nozzle (60) when the shoulder lid (80) is closed, thereby sealing the discharge port (62).

The nozzle (60) is fixedly coupled with one side of the shoulder (50) as at least a portion thereof is inserted thereto. A discharge port (62) is formed at the center of the nozzle (60) to discharge the liquid content to the outside, wherein the discharge port (62) can temporarily be connected to or blocked from the discharge passage (52) of the shoulder (50) by the discharge valve (70).

As shown in FIG. 3, the nozzle (60) may be provided with a first lower extension protrusion (61) extending downward, and a second lower extension protrusion (63) spaced at a predetermined interval from the outside of the first lower extension protrusion (61) and extending downward. The first lower extension protrusion (61) is inserted as it is tightly contacted with the outer periphery of the first upper extension protrusion (55) of the shoulder (50), and the second lower extension protrusion (63) is fixedly coupled as it is tightly contacted with the inner periphery of the second upper extension protrusion (57) of the shoulder (50).

Meanwhile, a valve fixing protrusion (64) may be extended downward at the interior of the nozzle (60), and the valve fixing protrusion (64) presses and fixes the upper end of the discharge valve (70) seating inside the shoulder (50) when the shoulder (50) and the nozzle (60) are coupled. Accordingly, the discharge valve (70) can be fixed without moving between the shoulder (50) and the nozzle (60).

The discharge valve (70) is installed in the shoulder (50), and selectively opens and closes the discharge passage (52) of the shoulder (50) according to changes in the internal pressure of the outer container. That is, the discharge valve (70), in the case of pressing the outer container (20), opens the discharge passage (52) as it is pushed up by the discharge pressure generated inside the inner container (10), to discharge the liquid contents that are moved to the discharge passage (52) to the discharge port (62), and in the case of depressing the outer container (20), it is restored to its original shape by elastic restoring force, to block the discharge passage (52). At this time, the discharge valve (70) is installed so that the central part thereof can move flexibly along the discharge direction of the liquid contents.

The discharge valve (70) is, as stated above, placed between the shoulder (50) and the nozzle (60), its outer periphery being tightly contacted with the inner periphery of the first upper extension protrusion (55), its rim being seated on the upper end of the valve seat (55*a*), and its upper end being pressed and fixed by the valve fixing protrusion (64). Here, it is desirable that the discharge valve (70) is a disk-shaped valve.

As described above, the container for discharging liquid contents according to one aspect of the present invention is provided with a discharge valve (70) that opens and closes the discharge passage (52) by means of the discharge pressure of the liquid contents, and the air inlet valve (40) that opens and closes the air inlet hole (38) according to changes in the internal pressure of the outer container (20), which allows each valve to be selectively operated in the case of pressing or depressing the outer container (20), resulting in easily discharging the liquid contents as well as stably maintaining the opening and closing of the container and the pressure inside the same. Further, the simplification of the opening and closing of the discharge passage (52) and the air inlet hole (38) and the sealing structure of the interior of the outer container (20) by pressing or depressing the outer container (20) results in simplifying the manufacturing process and improving the productivity through the reduction of manufacturing cost.

FIGS. 4 to 7 are views illustrating the operating process of the container for discharging liquid contents according to one aspect of the present invention, and the operating process of the container for discharging liquid contents according to one aspect of the present invention are explained with reference to them.

Figure 4:
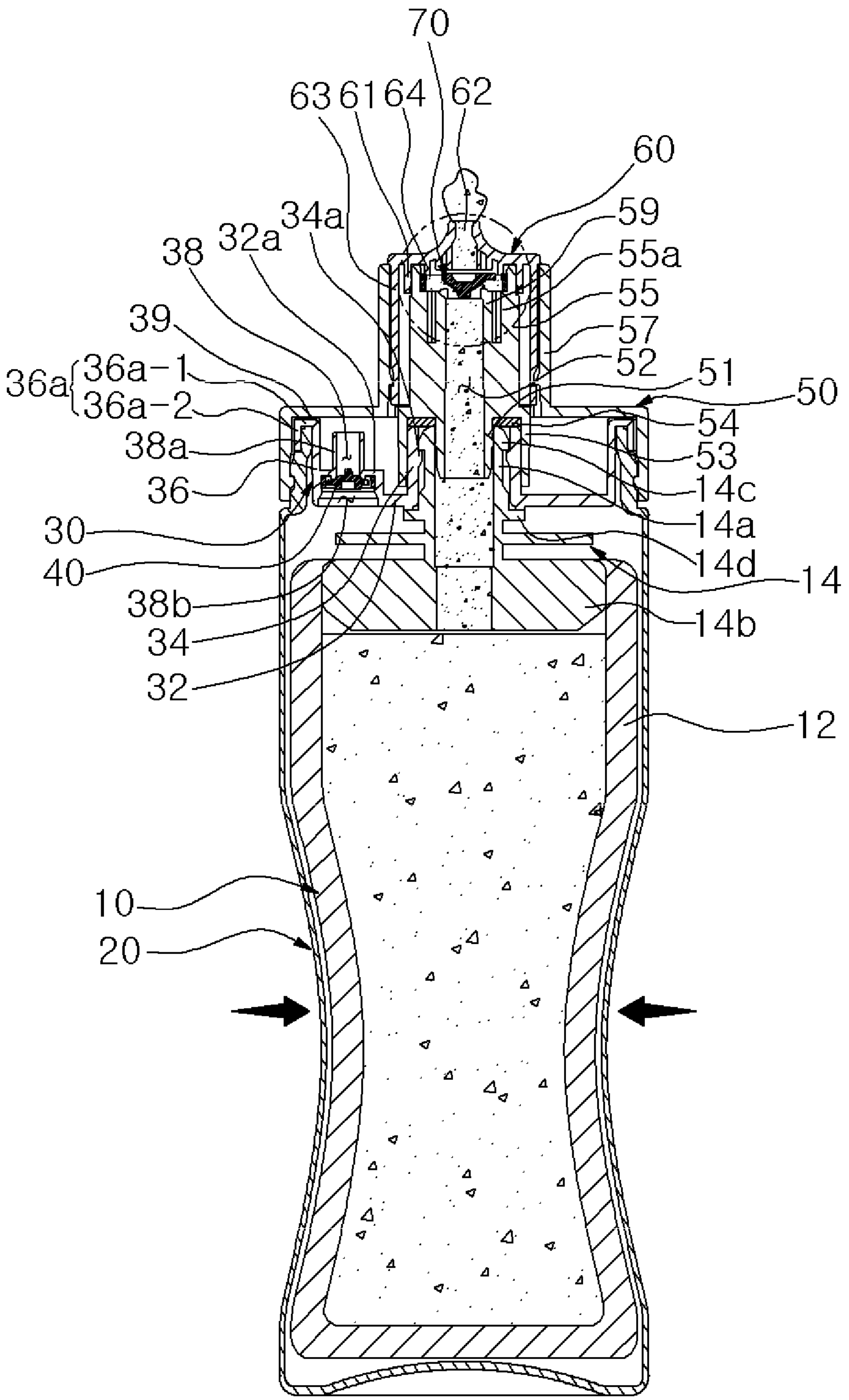
FIG. 4 is a sectional view illustrating a state of pressing the outer container according to one aspect of the present invention.
Figure 5:
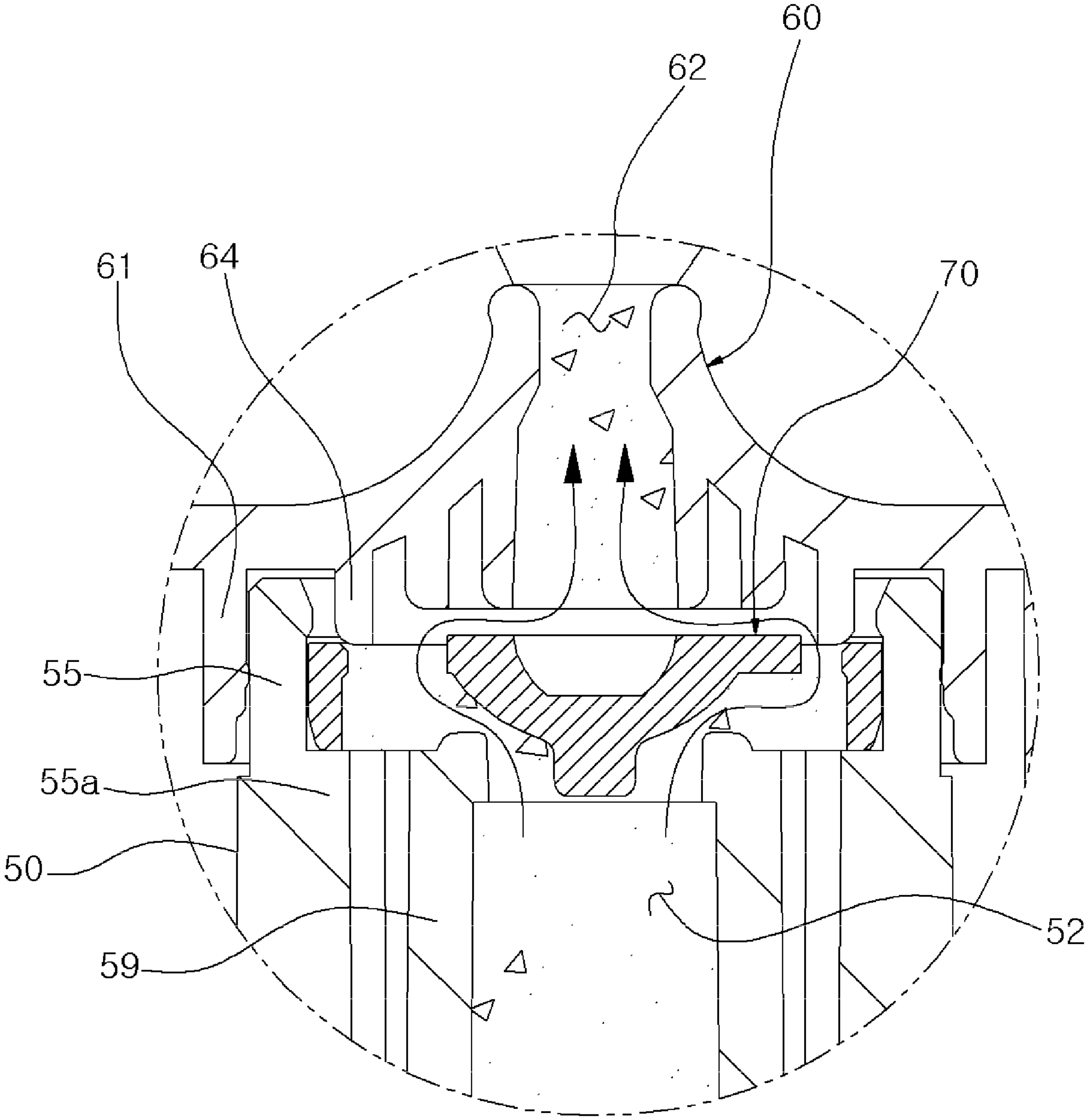
FIG. 5 is a partially enlarged view of FIG. 4.
Figure 6:
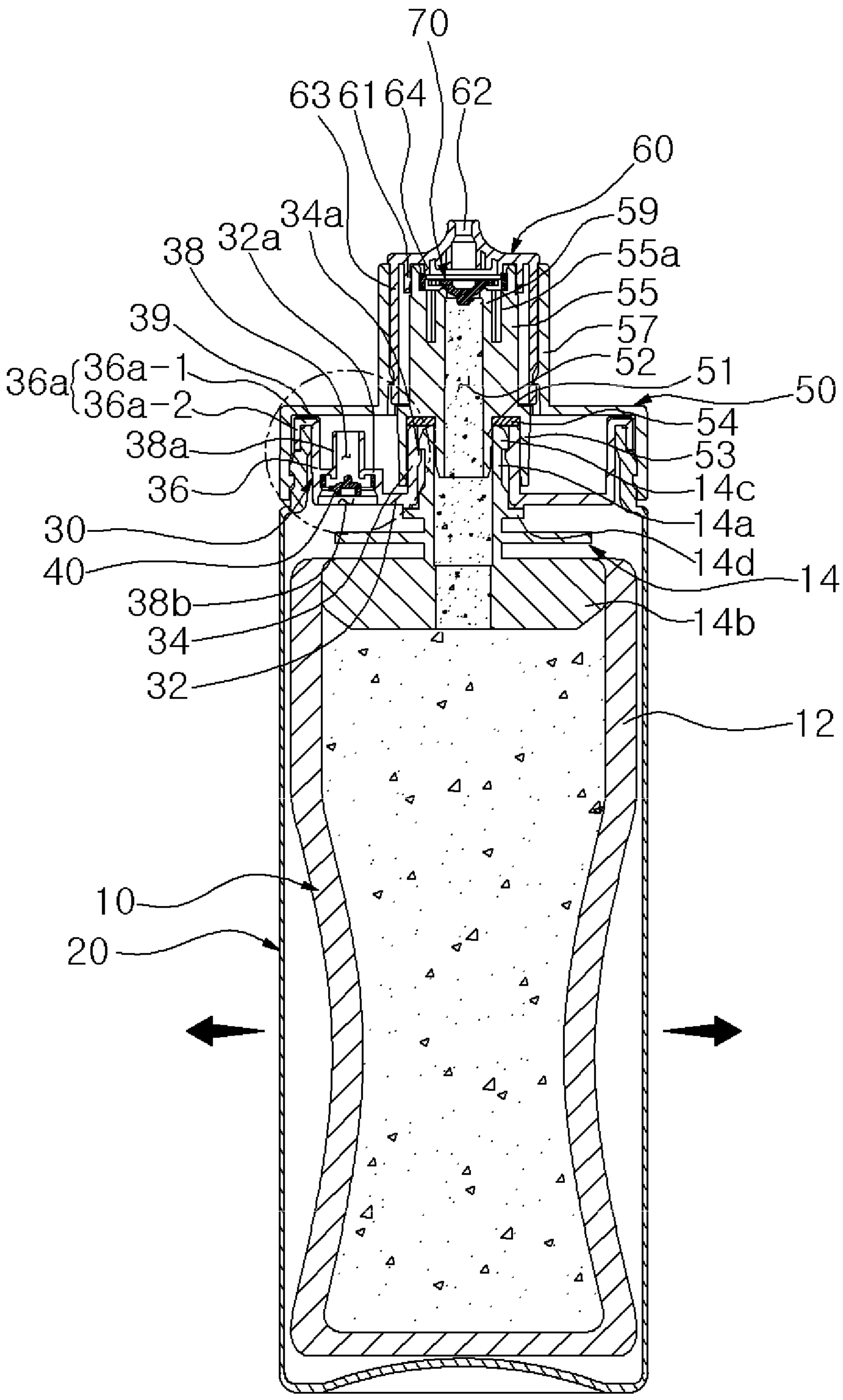
FIG. 6 is a sectional view illustrating a state of depressing the outer container according to one aspect of the present invention.
Figure 7:
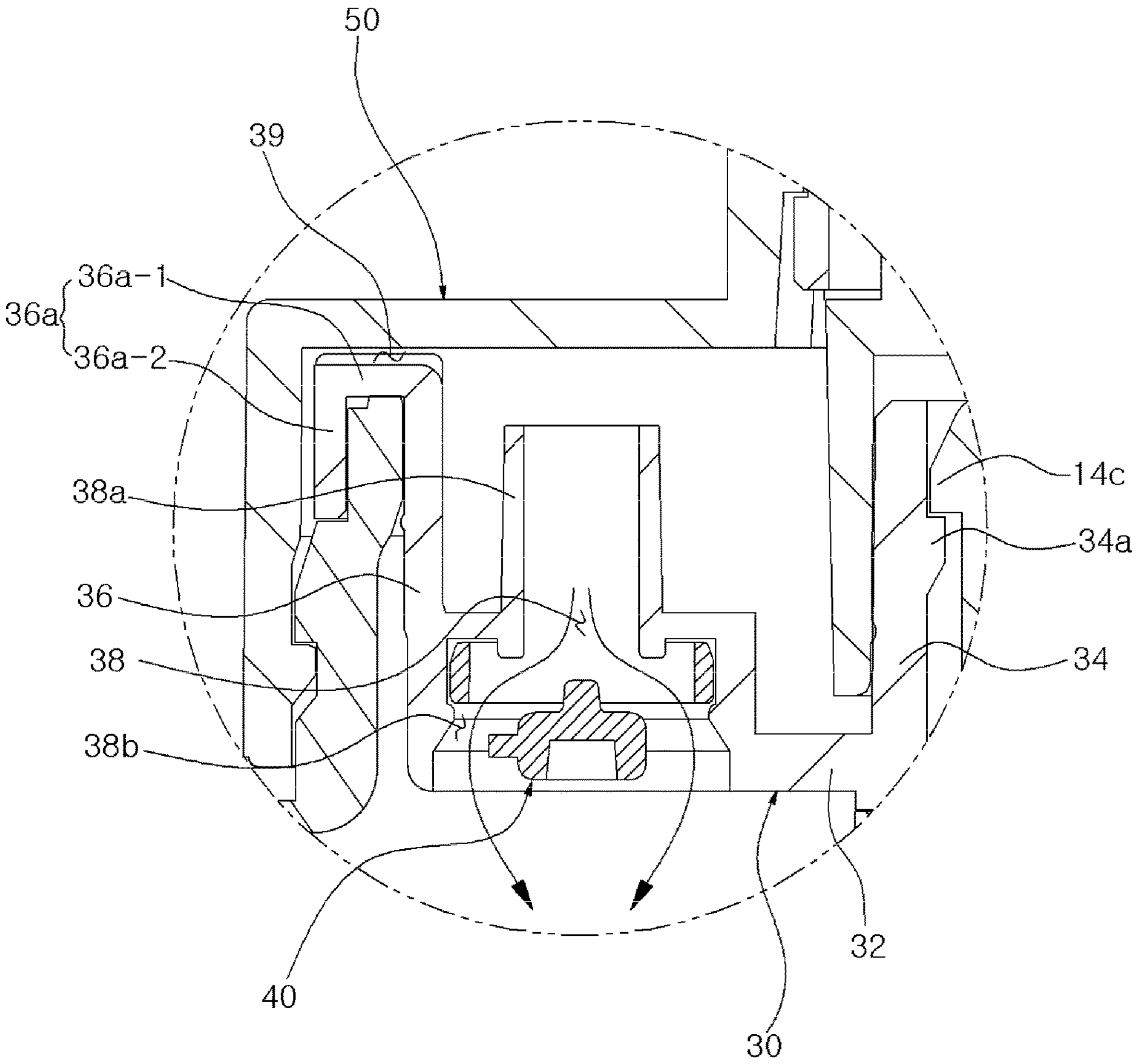
FIG. 7 is a partially enlarged view of FIG. 6.

FIG. 4 is a sectional view illustrating a state of pressing the outer container according to one aspect of the present invention, FIG. 5 is a partially enlarged view of FIG. 4, FIG. 6 is a sectional view illustrating a state of depressing the outer container according to one aspect of the present invention, and FIG. 7 is a partially enlarged view of FIG. 6.

In order to use the container for discharging liquid contents according to one aspect of the present invention, first, the shoulder lid (80) is rotated from the shoulder (50) to open the discharge port (62) of the nozzle (60).

Then, when the side of the outer container (20) is pressed, the inner container (10) placed inside the outer container (20) is pressed as well, which generates pressure inside the inner container (10), and the liquid contents accommodated in the inner container (10) are moved to the discharge passage (52) via the inlet (14*a*), as shown in FIG. 4. Simultaneously, as the discharge valve (70) is pushed up by the discharge pressure of the liquid contents moved to the discharge passage (52), the discharge passage (52) of the shoulder (50) is opened, which allows the liquid contents to be discharged to the outside through the discharge port (62), as shown in FIG. 5. At this time, the air inlet hole (38) of the sealing frame (30) is kept closed by the air inlet valve (40).

Then, the side of the outer container (20) is depressed, the discharge valve (70) is restored to its original shape, thereby closing the discharge port (62) of the nozzle (60), as shown in FIG. 6. Simultaneously, as the air inlet valve (70) is pulled by the vacuum pressure generated inside the outer container (20), the air inlet hole (38) of the sealing frame (30) is opened, and outside air enters the gap between the outer container (20) and the shoulder (50) and the air passage hole (39), as shown in FIG. 7, and flows into the inside of the outer container (20) through the air inlet hole (38), the outer container (20) is restored to its original shape.

Although the above description has been made with reference to illustrative aspects and drawings as well as certain matters such as specific components, the aspects are provided for overall understanding of the present disclosure, and the present disclosure is not limited to the aspects. It is understood by those skilled in the art that various changes and modifications can be made in these aspects. Therefore, the spirit of the present disclosure may not be construed as being limited to the aspects described herein, and all variations within the scope of the appended claims and their equivalents are to be construed as being included in the scope of the present disclosure.

DESCRIPTION OF REFERENCE NUMERALS

10: inner container 12: receiving portion
14: coupling portion 14*a*: inlet
20: outer container 30: sealing frame
32: bottom surface 34: inner wall
36: outer wall 38: air inlet hole
40: air inlet valve 50: shoulder
51: first tightly-contacting protrusion 52:
53: second tightly-contacting protrusion 60:
62: discharge port 70: discharge valve
80: shoulder lid 82: sealing protrusion

The invention claimed is:

1. A container for discharging liquid contents, comprising:

an inner container in which liquid contents are accommodated;

an outer container surrounding the outside of the inner container;

a sealing frame which blocks an open side of the outer container, is coupled with the inner container, and is provided with an air inlet hole;

an air inlet valve which is installed in the sealing frame and opens and closes the air inlet hole in response to changes in the pressure inside the outer container;

a shoulder which is coupled to one side of the outer container and surrounds the sealing frame, and is provided with a discharge passage formed therein;

a nozzle which is coupled to the shoulder and is provided with a discharge port formed therein; and a discharge valve which is installed on the shoulder and opens and closes the discharge passage by means of the discharge pressure of the liquid contents, wherein the shoulder is provided with a first tightly-contacting protrusion on the lower side, and a second tightly-contacting protrusion that is spaced apart from the outside of the first tightly-contacting protrusion at a predetermined interval, said first and second tightly-contacting protrusions being tightly contact with the both sides of a hard coupling portion of the inner container and the sealing frame, such that the inner container and the sealing frame are not spaced from each other.

2. The container according to claim 1, wherein the inner container is a pouch container of which the shape varies as the liquid contents accommodated therein are exhausted.

3. The container according to claim 1, wherein the inner container consists of: a soft receiving portion for accommodating the liquid contents therein; and the hard coupling portion which is coupled to one side of the receiving portion and is provided with an inlet portion.

4. The container according to claim 1, wherein the sealing frame consists of a bottom surface, an inner wall extending upward from the bottom surface, and an outer wall spaced apart at a predetermined interval from the outside the inner wall, while at least a part thereof is inserted into the open portion at the open side of the outer container.

5. The container according to claim 4, wherein a through hole, through which the inlet portion of the inner container passes, is formed inside the inner wall, and wherein a fitting bending portion is extendedly formed outside the outer wall so as to be fitted into a top of the outer container.

6. The container according to claim 1, wherein an air inlet guide pipe is extendedly formed in one side, and a valve insertion groove into which the air inlet valve is inserted is formed on the other side, with respect to the air inlet hole of the sealing frame.

7. The container according to claim 1, where at least one air through hole is formed on an upper end of a rim of the sealing frame.

8. The container according to claim 1, wherein a soft sealing ring is provided between the first and second tightly-contacting protrusions and comes into close contact with the top of the inner container and the sealing frame.

9. The container according to claim 1, wherein at least one valve seating portion on which the discharge valve is seated, is formed inside the shoulder to be spaced at a predetermined interval so that it can be vertically extended.

10. The container according to claim 1, wherein a shoulder lid is provided in one side of the shoulder so as to open and close the discharge hole of the nozzle.

11. The container according to claim 1, wherein the air inlet valve and the discharge valve are disk-shaped valves.

* * * * *